F. HORNQUIST.
RUBBER SOLE.
APPLICATION FILED FEB. 14, 1920.
1,351,291.
Patented Aug. 31, 1920.
2 SHEETS—SHEET 1.
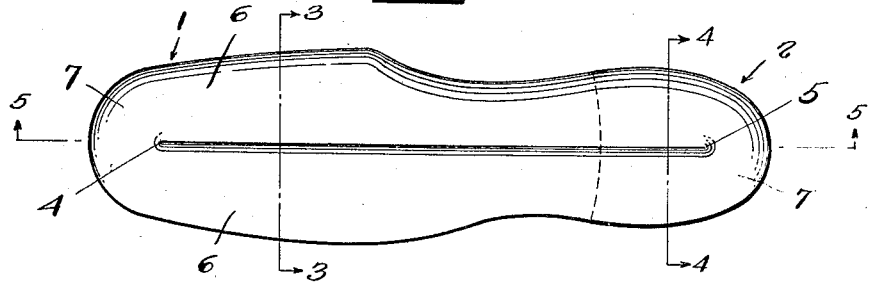
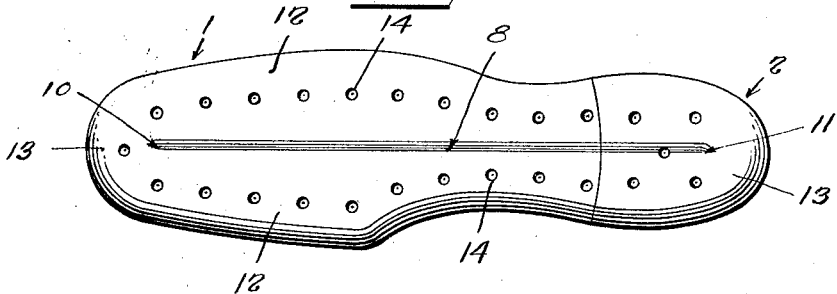
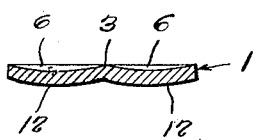  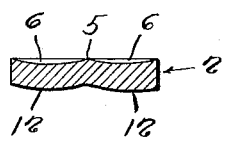
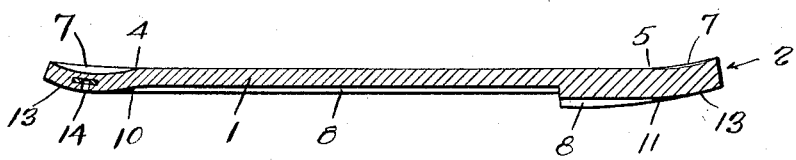
Witness
Evans D. Haines
Inventor
F. Hornquist.
By H. B. Willson &co
Attorneys

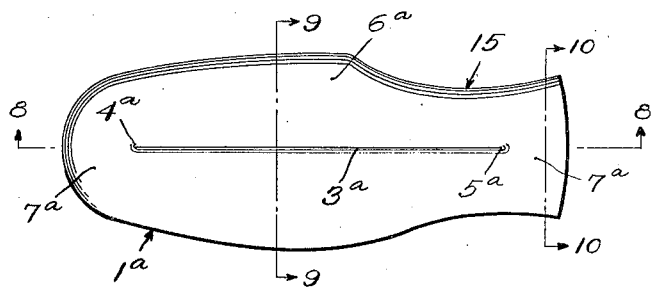
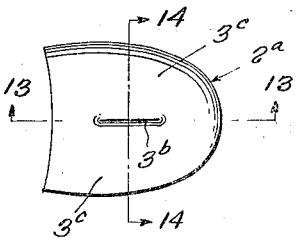
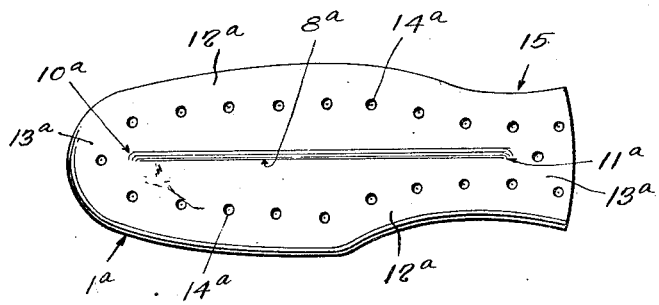
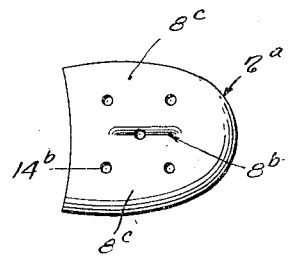
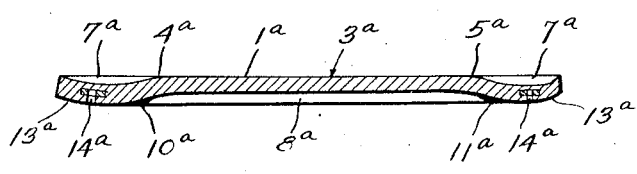
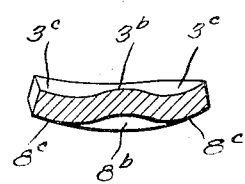
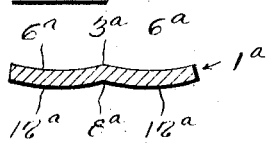
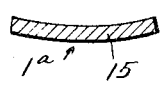
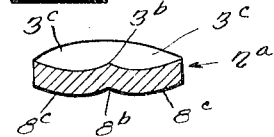

UNITED STATES PATENT OFFICE.

FRANK HORNQUIST, OF MOUNT JEWETT, PENNSYLVANIA.

RUBBER SOLE.

1,351,291.  Specification of Letters Patent.  Patented Aug. 31, 1920.

Application filed February 14, 1920. Serial No. 358,741.

*To all whom it may concern:*

Be it known that I, FRANK HORNQUIST, a citizen of the United States, residing at Mount Jewett, in the county of McKean and State of Pennsylvania, have invented certain new and useful Improvements in Rubber Soles; and I do declare the following to be a full, clear, and exact description of the invention, such as will enable others skilled in the art to which it appertains to make and use the same.

My invention relates to improvements in rubber shoe heels and soles and has for its object to provide a device of this character which may be attached with few nails and without the use of cement, novel provision however, being made for drawing the center and edges of the device into tight contact with the shoe to which it is attached, when the nails are driven in place.

With the foregoing in view, the invention resides in the novel construction of the device hereinafter described and claimed, the descriptive matter being supplemented by the accompanying drawing.

Figure 1 is a top plan view of an integral sole and heel constructed in accordance with my invention and Fig. 2 is a bottom plan view thereof.

Figs. 3, 4 and 5 are sectional views on the planes indicated by the lines 3—3, 4—4 and 5—5 of Fig. 1.

Figs. 6 and 7 are respectively top and bottom plan views of a sole formed separately from the heel.

Figs. 8, 9 and 10 are sectional views as indicated by the lines 8—8, 9—9 and 10—10 of Fig. 6.

Figs. 11 and 12 are respectively a top and a bottom plan view of the heel used in connection with the sole as shown in Figs. 6 to 9.

Figs. 13 and 14 are longitudinal and transverse sectional views on the planes indicated by the lines 13—13 and 14—14 of Fig. 11.

In the form of the device shown in Figs. 1 to 5, the numerals 1 and 2 designate a rubber sole and heel respectively, the two being integrally joined. Formed on the upper side of the sole and heel, is a longitudinal ridge 3 whose ends 4 and 5 terminate a short distance from the front end of the sole 1 and the rear end of the heel 2. Between the ridge 3 and the side edges of the sole and heel, the device is concave as indicated at 6, and is similarly concave between the ends 4 and 5 of said ridge and the adjacent ends of the sole and heel, as shown at 7.

The lower side of the sole and heel are provided with a central longitudinal channel 8 terminating short distances from the front end of the sole and the rear end of the heel as indicated by the numerals 10 and 11. Between this channel and the side edges of the sole and heel, said sole and heel are of convex form, as designated by the numeral 12, and a similar convex formation 13 exists between the ends 10 and 11 of the channel and the adjacent ends of the sole and heel.

The crest of the convex formation 12—13 is provided with nail-holes 14 or other adequate nail guides and it thus follows that when the attaching nails are driven, the concavo-convex peripheral portion of the sole and heel will be flattened. This insures that the center and the edges of the device shall be held in tight contact with the shoe to which it is attached, without the necessity of using cement, nor are a great number of nails required. Holding the edges of the sole tightly in place prevents the entrance of moisture, while tight contact of the center of the sole with the other sole to which it is attached, prevents the rubber sole from bowing away from the shoe as now often occurs.

In Figs. 6 to 10 I have shown a sole $1^a$ separate from the heel. This sole is provided with an instep portion or shank 15 whose rear end is adapted to abut the heel with which it is used, said end being preferably of the concavo-convex form shown in Fig. 10. The sole $1^a$ and its shank 15 are provided along their upper side with a central longitudinal ridge $3^a$ whose front and rear ends $4^a$ and $5^a$ terminate in spaced relation with the front end of the sole and the rear end of its shank. Between the ridge $3^a$ and the side edges of the sole and shank, a concave formation $6^a$ is provided, and a similar formation $7^a$ exists between the ends of and $5^a$ of the ridge and the adjacent ends of the sole and shank.

The lower side of the parts $1^a$ and 15 is provided with a central longitudinal channel $8^a$ whose front and rear ends $10^a$ and $11^a$ terminate below the ends $4^a$ and $5^a$ of the ridge $3^a$. Between the channel $8^a$ and the side edges of the sole and shank, the device is of convex form as shown at $12^a$, and a similar formation $13^a$ exists between the ends of the channel and the adjacent ends of the sole and shank.

At the crest of its convex portion 12ª—13ª, the sole and its shank are provided with suitable nail guides 14ª. When the nails are driven through these guides, the sole is fastened as it is attached, with the same result as that described in connection with Figs. 1 to 5.

In Figs. 11 to 14 I have shown a heel 2ª which may be used with a sole shown in Figs. 6 to 10, although it is equally well adaptable to shoes having other forms of soles. The heel is of substantially concavo-convex form with its concave side disposed upwardly and provided with a central longitudinal ridge 3ᵇ. Between this ridge and all edges of the heel, the upper side of the latter is of approximately concave shape in section as indicated at 3ᶜ. The lower side of the heel 2ª is longitudinally channeled at approximately its center portion as indicated at 8ᵇ, and from this channel to its edges, said lower side is of convex form as shown at 8ᶜ. Along the crest of this convex formation, are a plurality of nail guides 14ᵇ. When the attaching nails are driven through these guides, the heel is flattened and thus its edges and center are tightly held in contact with the shoe. Here again, few nails are necessary and no cement need be used.

From the foregoing, taken in connection with the accompanying drawing, it will be seen that although my invention may be easily and inexpensively manufactured from rubber, it will be highly effective and in every way desirable. In all forms of the device, its edges and center are held tightly in place without the necessity of using a great number of nails or cementing. Since probably the best results may be obtained from the details disclosed, they may be followed, but I wish it understood that within the scope of the invention as claimed, numerous minor changes may well be made.

I claim:

1. A rubber shoe sole having a central longitudinal ridge on its upper side terminating a short distance in rear of its front end, said upper side being concave from said ridge to the side edges of the sole and also from the front end of the ridge to the front end of the sole; the lower side of said sole having a central longitudinal channel terminating a short distance from its front end, said lower side being convex from said channel to the side edges of the sole and between the front end of the sole and the corresponding end of the channel; said sole having nail guides at substantially the crest of its convex portion, whereby the attaching nails will flatten the sole and retain its center and edges in tight contact with the shoe to which it is attached.

2. A rubber sole and heel formed integrally, the upper side of said sole and heel having a central longitudinal ridge terminating a short distance from the front end of the sole and the rear end of the heel, said upper side of the sole and heel being concave from the ridge to their side edges and also concave from the ends of said ridge to the front end of the sole and the rear end of the heel; the lower side of said sole and heel having a central longitudinal channel terminating substantially even with the ends of said ridge, said lower side being convex from said channel to the side edges of the sole and heel and also convex from the ends of the channel to the front end of the sole and the rear end of the heel; said sole and heel having nail guides at the crest of their convex portion, whereby the attaching nails will flatten said sole and heel and retain their edges and centers in tight contact with the shoe.

3. A rubber shoe sole having an instep portion or shank of substantially concavo-convex form in transverse section at its rear end; the upper side of said sole and shank having a central longitudinal ridge terminating a short distance from the front end of the sole and the rear end of the shank, said upper side being concave from said ridge to the said edges of the sole and shank and also concave from the ends of said ridge to the ends of the sole and shank; the lower side of said sole and shank having a central longitudinal channel beneath said ridge and being of convex form beneath the concave portion of the aforesaid upper side; said lower side having nail guides at substantially the crest of its convex portion, whereby the attaching nails will flatten the sole and shank and retain their centers and edges in tight contact with the shoe to which they are applied.

In testimony whereof I have hereunto set my hand.

FRANK HORNQUIST.